Feb. 7, 1956  D. B. GARDINER  2,733,571
POWER TRANSMISSION

Filed May 14, 1954  2 Sheets-Sheet 1

INVENTOR.
DUNCAN B. GARDINER
BY
*Ralph R. Tweedle*
ATTORNEY

INVENTOR.
DUNCAN B. GARDINER

United States Patent Office 2,733,571
Patented Feb. 7, 1956

2,733,571

POWER TRANSMISSION

Duncan B. Gardiner, Detroit, Mich., assignor to Vickers Incorporated, Detroit, Mich., a corporation of Michigan Application May 14, 1954, Serial No. 429,746

4 Claims. (Cl. 60—52)

This invention relates to power transmissions, and is particularly applicable to those of the type comprising two or more fluid pressure energy translating devices, one of which may function as a pump and another as a fluid motor.

The pump may, for example, be driven from the engine of a tractor. Consequently if a fixed displacement pump is used, the displacement of the pump will vary according to engine speeds.

Hydraulic transmissions mounted on farm tractors for driving accessories or implements have become recognized as the simplest, the most efficient and the most economical method for driving said accessories. Several problems are presented, however, because of the nature of the various types of work to be performed. Each accessory has its own independent load requirements and it is practical in many instances to furnish a separate motor for each accessory. One of these motors may operate its implement most efficiently when supplied from a pump of a certain maximum displacement. Another motor may operate its load most efficiently when supplied from a pump having a greater maximum displacement. The problem of meeting the displacement requirements of each motor could be solved by utilizing a variable displacement type of pump. But this is impractical in the farming equipment field because of higher cost of such a pump. It is possible to utilize two fixed displacement pumps and provide a transmission which utilizes one pump to operate the motor having the smaller displacement requirement and both pumps to operate the motor having the higher displacement requirement.

Where one of the implement handling hydraulic motors is provided with a servo control valve with a position responsive or load responsive follow-up mechanism, it has been found that frequent corrective actuations of the motor are required, due to changes in operating conditions as the tractor travels along. Where the pump is provided with unloading mechanism which bypasses its delivery when all operating valves are in neutral, it is sometimes found that the repeated actuations of the servo control valve are so frequent that the pump unloading mechanism has barely time to operate before another corrective action is required, necessitating reloading of the pump. This generates excessive heat and pressure, and causes rapid pump wear.

It is an object of the present invention to provide an improved hydraulic transmission system particularly adapted for use with a fixed displacement pump and a servo controlled hydraulic motor which will provide for operation of the servo controlled hydraulic motor during its repeated normal small corrective actuations under conditions favorable to long pump life. For this purpose the present invention utilizes an intensifier of small capacity sufficient to handle the requirements of the small corrective actuations. This intensifier is permitted to reset during the intervals between corrective actuations while the pump is unloaded. Preferably the intensifier is so arranged that when its capacity has been used up a bypass around the intensifier is automatically brought into operation so as to permit direct operation of the servo controlled motor and any other motor in the system.

Further objects and advantages of the present invention will be apparent from the following description, reference being had to the accompanying drawings wherein a preferred form of the present invention is clearly shown.

Figure 1:
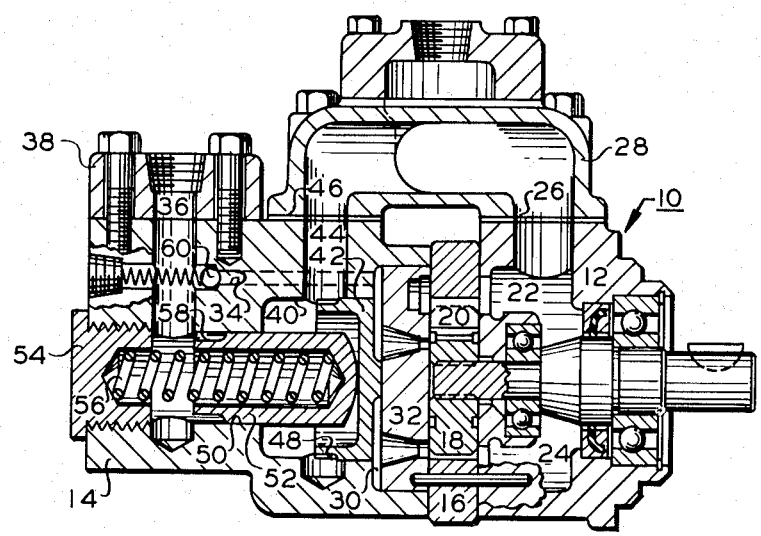
Figure 1 is a sectional view of a rotary fluid energy translating device embodying a preferred form of the present invention and taken on line 1—1 of Figure 2.
Figure 2:
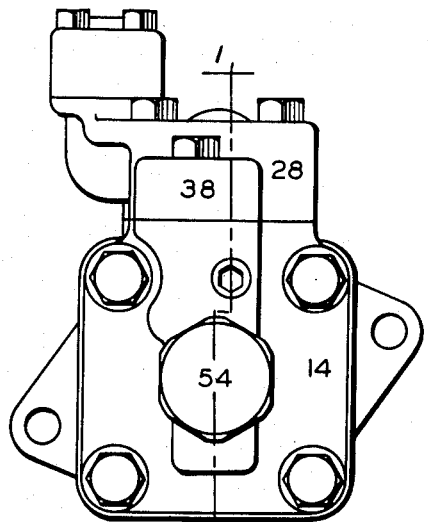
Figure 2 is an end view of the fluid energy translating device shown in Figure 1.

Referring to Figure 1, there is shown a rotary vane pump indicated generally by the numeral 10, the basic construction of which is of the type illustrated in the patent to Gardiner et al., No. 2,544,988. The body of the pump comprises an inlet section 12, an outlet section 14, and sandwiched between said sections a cam ring 16. Mounted within the ring 16 is a rotor 18 carrying reciprocating vanes 20. A branched inlet passage 22 and 24 connected to an inlet supply opening 26 of a manifold member 28 leads to the inlet working chamber of the pump. A pressure chamber 30 is formed in the outlet section 14 and within which is mounted a pressure plate 32, one side of which is maintained in fluid sealing engagement against the ring 16 and rotor 18 by pressure fluid in the chamber acting on the opposite side of the plate. The outlet working chambers of the pump are connected directly to the pressure chamber 30 by means of porting in the pressure plate. An outlet passage indicated generally by the numeral 34 leads from the pressure chamber 30 to an outlet port 36 in an outlet flange member 38.

A large bore 40 forms an extension of the pressure chamber 30 and carries a slidable piston 42 therein. The bore 40 intersects a tank passage 44 which communicates with the interior of manifold 28. A gasket 46 seals the connection between passage 44 and manifold 28. Notches 48 are formed in the left-hand end of the piston 42 so that communication between the left-hand end of bore 40 and tank passageway 44 is maintained while the piston 42 is in its leftmost position.

The outlet section 14 is also provided with a bore 50 within which a hollow piston 52 is slidably mounted. The left end of bore 50 is closed by a plug 54, and a spring 56 urges both pistons 52 and 42 to the right. Piston 52, at its left end, is provided with notches 58 so as to maintain communication between the left end of bore 50 and delivery passage 36.

The outlet passage 34 has a check valve 60 which permits free flow from pressure chamber 30 to the delivery port 36 and prevents back flow in the opposite direction.

Figure 3:
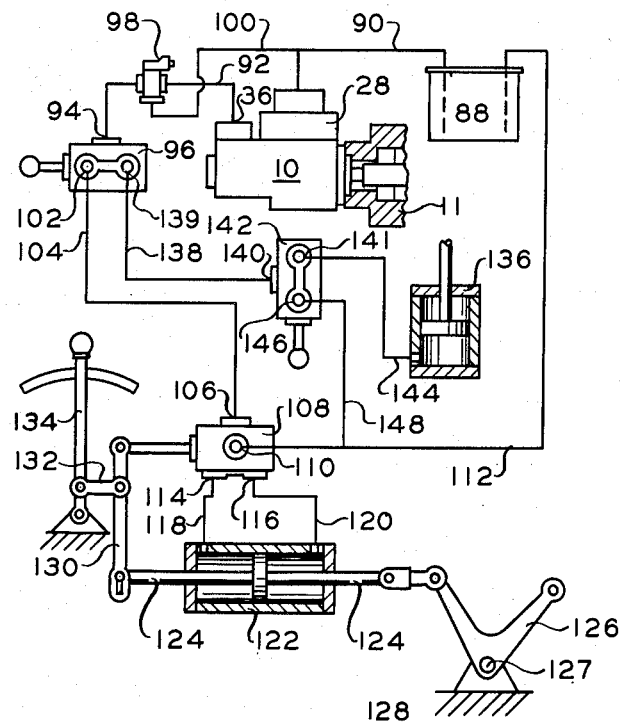
Figure 3 is a diagrammatic view of a hydraulic power transmission system embodying a preferred form of the present invention.

Referring to Figure 3, there is shown a hydraulic power transmission system incorporated within which is the pump 10, driven by a variable speed prime mover 11 such as a tractor engine. A tank 88 is connected by a supply conduit 90 to the manifold member 28. A delivery conduit 92 leading from the outlet or delivery port 36 in the flange member 38 is connected to the pressure port 94 of a three-way directional control valve 96. A pressure relief valve of a suitable type, indicated by the numeral 98 is incorporated in the pressure delivery conduit 92. It will bypass the pump delivery to the tank 88 at predetermined pressure increases through a relief conduit 100.

One of the motor ports 102 of the valve 96 is connected by a conduit 104 to the pressure port 106 of a four-way directional valve 108. A return port 110 of the valve 108 is connected by a conduit 112 to the tank 88. The two motor ports 114 and 116 of the valve 108 are connected by conduits 118 and 120 to opposite ends of a double acting motor 122. A piston rod 124 extending from both ends of the motor is illustrated as being fastened at one end to a bell crank 126 pivoted, for example, on a rock shaft 127 which may be fastened to a tractor frame indicated generally at 128. The opposite end of the rod 124 is mechanically connected by linkage indicated generally by the numerals 130 and 132 to a shiftable control valve not shown, within the directional valve 108 and to a manually operated lever or handle 134 for operating the shiftable control valve. While this is shown as manually operable it is intended as representative of any other well known means for input control such as automatic draft controls, depth controls, etc. The linkage illustrated is a conventional follow-up linkage to provide directional operation of the motor by manual operation of the valve and a following action of the valve to an open center, that is, a pump unloading position when the motor has been operated to a position governed by the length of movement of the lever or handle 134.

The motor 122 may drive through the bell crank 126 a plowing implement and should be considered as requiring a delivery from the pump less than the full displacement of said pump for most efficient operation of the plowing implement.

For the purpose of driving another load device, such as a front end loader, there is shown another single acting motor 136. A pressure delivery line 138 connects the other motor port 139 of the three way valve 96 to the pressure port 140 of a three way valve 142 for controlling the direction of operation of the motor 136. The motor port 141 of the valve 142 is connected to the lower end of the motor 136 by a conduit 144, and a return port 146 of the valve 142 is connected to tank 88 by conduits 148 and 112.

The three way directional valve 142, in neutral position, blocks the cylinder port 141 so as to prevent flow in or out, and connects pressure port 140 to tank port 146 for the purpose of unloading the pump.

The operation of the system can best be considered during conditions when the tractor is performing a usual function, such as plowing, by means of an implement connected to the lift arm 126. With the pump in motion, and the control lever 134 having previously been set to a desired position, the action of the servo linkage 130 is such as to maintain this position of the arm 126 and its associated implement within a predetermined limit irrespective of soil conditions or other varying factors encountered as the tractor moves along the ground. Due to unavoidable leakages the position of the motor piston will change, thus actuating the servo valve 108 through link 130. This cuts off the unloading bypass of the pump and causes a corrective actuation of the hydraulic motor 122.

Referring now to Figure 1 the parts are shown in the position occupied while the pump is unloaded and all the oil circulates through passage 34, past check valve 60, and out through the valves 96 and 108 to tank. Under these conditions the pressure required to push the oil through this substantially unrestricted path is negligible, and the force of spring 56 is sufficient to hold the pistons 42 and 52 in their right-hand positions. The pressure required to open check valve 60 is of course less than the pressure required to shift the piston 42 against the force of spring 56.

During a corrective action of the servo controlled motor 122 the pump unloading bypass is closed at the valve 108, and the only delivery path available is into the motor 122. For example, if the implement has dropped below its normal desired position the valve 108 will be shifted in a direction to port the delivery of the pump into line 120 and raise the implement. When the valve 108 has shifted to initiate this corrective action, the pump delivery will have to be at a sufficiently high pressure to overcome the force exerted by the weight of the implement and the ground forces on it tending to lower the implement. This pressure will normally be greater than that required (when exerted in chamber 30) to overcome spring 56. Consequently, pistons 42 and 52 are moved to the left, discharging oil at negligible pressure from bore 40 into port 44, and discharging oil at motor operating pressure from the left end of bore 50 through passage 36. This produces an intensifier action with the result that the operating pressure against which the pump must deliver into chamber 30 is a fraction of the resisting pressure which has to be overcome at motor 122. The ratio of these two pressures is of course the ratio of the areas of the pistons 42 and 52.

The volume of fluid displaceable from the left end of bore 50 is sufficient to actuate the motor 122 through the distance it travels during a normal corrective actuation. When the corrective action is complete, the linkage 130 will have returned the valve 108 to its centered, pump unloading, position. Pressure is thus relieved from the delivery port 36, and the pistons 52 and 42 may then return to the right under the force of spring 56. The oil thus discharged into pressure chamber 30 escapes through delivery passage 34 and check valve 60. Part of it goes back to tank through the unloading path and part of it refills the bore 50. The left end of bore 40 is refilled from passage 44.

Whenever a longer actuating stroke of the motor 122 is desired, and likewise whenever a sustained raising motion at the motor 136 is desired, the appropriate control valve 108 or 142 is actuated manually. During the first increment of motor travel the intensifier pistons 42 and 52 move to the left in the manner previously described, and come to a stop at the end of their stroke. Thereafter, pressure builds up in chamber 30 and the full pump delivery is directed through passage 34 and check valve 60 to the delivery port 36. The intensifier pistons will remain pushed to the left until the motor actuation has stopped and the control valve concerned has been restored to neutral position for unloading the pump.

It will thus be seen that the present invention provides an improved system particularly adapted for the problems arising in hydraulic drives which have a servo controlled intermittent corrective action, and also have more sustained actuation required at more widely spaced intervals. Thus during the times when only the frequently repeated corrective actuations of the servo controlled motor are required, the pump operates through the intensifier. This gives the pump a mechanical advantage over the motor in a ratio determined by the area ratios of the intensifier, and results in materially longer life under long periods of servo controlled operation. The pump is nevertheless available to operate the motor continuously against full resisting motor pressure.

It will be noted that during the first condition described above the speed of motor actuation is reduced, which in many cases is a favorable factor because of reduced shock to the entire tractor and implement system, and because it lends greater precision to the positioning of the implement by the servo control. At the same time, whenever the full volumetric delivery rate of the pump is desired for a longer stroke actuation of either motor, it is available as soon as the intensifier has completed its stroke. Thus the implement may be quickly raised without requiring any adjustment of pump delivery or of flow regulating devices which heretofore have been considered necessary to accommodate the high and low volume requirements of these two conditions.

While the form of embodiment of the invention as

What is claimed is as follows:

1. In a power transmission system of the positive displacement, hydraulic type the combination of a fixed displacement pump, a fluid motor, a control valve for directing fluid to the motor in one position and for unloading the pump and blocking the motor in another position, follow-up means for actuating the valve in response to a changing condition at the motor, manual means for actuating the valve, an intensifier connected to receive the entire pump delivery and to discharge only a portion thereof to the control valve, the intensifier having a capacity sufficient to actuate the motor through a follow-up corrective actuation, and a check valve controlled passage for supplying fluid directly from the pump to the control valve when the intensifier capacity has been exhausted.

2. In a power transmission system of the positive displacement, hydraulic type the combination of a fixed displacement pump, a fluid motor, a control valve for directing fluid to the motor in one position and for unloading the pump and blocking the motor in another position, follow-up means for actuating the valve in response to a changing position of the motor, manual means for actuating the valve, an intensifier connected to receive the entire pump delivery and to discharge only a portion thereof to the control valve, and means for by-passing the pump delivery around the intensifier.

3. In a power transmission system of the positive displacement, hydraulic type the combination of a fixed displacement pump, a fluid motor, means for controlling the motor through a repeated series of short actuating cycles, additional means for controlling the motor through a single actuating cycle of longer continuous duration, and a differential area intensifier connected between the pump and the control means and having a capacity sufficient to drive the motor through a short cycle but insufficient to drive the motor through a longer cycle, and means for by-passing the intensifier when its capacity is exhausted.

4. A two-speed hydraulic pressure supply comprising a fixed displacement pump having an inlet and an outlet, a two-diameter cylinder having its large end exposed to the outlet of the pump, a passage connecting the junction of the two cylinder diameters to the pump inlet, a delivery port connected to the small end of the cylinder, a two-diameter piston assembly slidable in the cylinder, a spring urging the piston assembly toward the large end of the cylinder, a passage connecting the pump outlet with the delivery port, a check valve controlling flow in the last named passage, and means forming a common housing for enclosing the pump cylinder and passages.

No references cited.